United States Patent [19]

Welter et al.

[11] Patent Number: 4,867,370
[45] Date of Patent: Sep. 19, 1989

[54] APPARATUS AND METHOD FOR ULTRASONIC WELDING OF WIRES

[75] Inventors: Curtis Welter, West Haven; Guillermo Coto, Monroe; Michael Patrikios, Stratford; Rodney Hawkins, Orange, all of Conn.

[73] Assignee: American Technology, Inc., Milford, Conn.

[21] Appl. No.: 167,827

[22] Filed: Mar. 28, 1988

Related U.S. Application Data

[63] Continuation-in-part of Ser. No. 36,477, Apr. 9, 1987, Pat. No. 4,799,614.

[51] Int. Cl.$^4$ ............................................. B23K 20/10
[52] U.S. Cl. ...................................... 228/110; 228/1.1
[58] Field of Search ........................ 228/110, 1.1, 111; 29/873, 882

[56] References Cited

U.S. PATENT DOCUMENTS

| | | |
|---|---|---|
| 3,053,124 | 9/1962 | Balamuth et al. |
| 3,328,610 | 6/1967 | Jacke et al. |
| 3,444,612 | 5/1969 | Pennings . |
| 3,602,421 | 8/1971 | Spratt .................................... 228/1 |
| 4,596,352 | 6/1986 | Knapp ................................. 228/1.1 |
| 4,646,957 | 3/1987 | Nuss .................................... 228/1.1 |

FOREIGN PATENT DOCUMENTS 3151151  6/1983  Fed. Rep. of Germany ....... 228/1.1

Primary Examiner—Richard K. Seidel
Assistant Examiner—Karen Skillman
Attorney, Agent, or Firm—Kramer, Brufsky & Cifelli

[57] ABSTRACT

An apparatus and method for ultrasonically welding wires includes an ultrasonic horn tip and associated structure for allowing adjustment to accommodate different diameters of wires to be welded while maintaining a tight grip around the wires during the welding process to avoid spreading or splaying of the wires. The tip is rotable to provide several alternative and interchangeable work surfaces on a standard-shaped readily machineable cross section, thereby allowing for a longer total worklife and a reduced cost of manufacture.

35 Claims, 5 Drawing Sheets

APPARATUS AND METHOD FOR ULTRASONIC WELDING OF WIRES

BACKGROUND OF THE INVENTION

This application is a continuation-in-part of U.S. patent application Ser. No. 036,477 filed Apr. 9, 1987 now U.S. Pat. No. 4,799,614, issued Jan. 24, 1989.

This application relates to U.S. patent application Ser. No. 033,810, entitled "Ultrasonic Weld Location Mask and Method of Use" by Hawkins et al, filed Apr. 3, 1987; and U.S. patent application Ser. No. 034,613, entitled "Variably-weighted Ultrasonic Welding Horn" by Welter, filed Apr. 6, 1987.

FIELD OF INVENTION

This invention relates to an apparatus and method for the ultrasonic welding of wires.

The apparatus and method includes a tip and associated means allowing for adjustment to accommodate different diameters of wire to be welded while maintaining a tight grip around the wires during the welding process to avoid spreading or splaying of the wires during the welding process. Further, the tip is rotatable to provide several alternative and interchangeable work surfaces on a standard-shaped readily machineable cross section, thereby allowing for a longer total worklife and a reduced cost of manufacture.

DESCRIPTION OF THE PRIOR ART

Wires may be ultrasonically welded to one another by placing the ends of the wires 7 firmly overlapping each other in a closed channel 1 formed between an ultrasonic welding tip 3 and a stationary support anvil 5 (as shown, e.g., in FIG. 1) and applying ultrasonic energy to the tip. The energy should be applied so that the tip vibrates parallel to the longitudinal axis of the wires to be welded, to intermolecularly bond the wire ends.

In order to assure that the vibrational energy is efficiently transmitted to the wires or workpiece, both the tip and the anvil have a serrated worksurface 9 for holding the wires or workpiece firmly in place.

Methods of generation of ultrasonic vibration are well known in the prior art (e.g., U.S. Pat. Nos. 3,053,124; 3,328,610; 3,444,612; and 3,602,421). A typical frequency of vibration may be twenty thousand cycles per second.

In order to prevent spreading or splaying of the wire or workpiece during the welding process, the wire or workpiece should be tightly confined within a compression chamber. Further, any change in the number or size of these wires or workpieces requires adjustment of the cross-sectional area of this chamber. It is desirable that this adjustment be done without the replacement of apparatus. Additionally, it is desirable that multiple available worksurfaces be provided in order to quickly replace any exhausted worksurfaces. This should be accomplished with easily machineable simply-shaped apparatus.

Along these lines, the device as shown in FIG. 1 has a number of disadvantages. First, the wires to be welded are held in a channel formed by the intersection of a notch 4 on the tip 3 and a notch 2 on the anvil 5. As the size of the mating notches 2,4 is not adjustable and the tolerance between the tip 3 and the anvil 5 along with the firmness of the serrated worksurface 9 on the workpiece or wires 7 is critical in order to prevent the wire end from extruding or splaying while in a plastic state during the welding process, a given tip is generally applicable to the welding of only one size of wire, or a limited number of ends thereof. A machine shop having occasion to weld various sizes of wires would have to obtain ultrasonic welding tips of corresponding notch sizes.

Secondly, the tip and the anvil have intricate shapes and the notches therein must be manufactured within close tolerances, thereby adding to manufacturing costs.

Lastly, the welding tip 3, as shown in FIG. 1, presents only two possible work surfaces 9. After the first worksurface 9 is exhausted, in that the gripping serrations and dimensional tolerances become worn after repeated use, the tip is rotated 180° to present a second serrated, gripping worksurface. After this second worksurface is exhausted, the tip is discarded.

As previously described, the manufacturing costs of this tip are high and a supply of tips with varying sizes of notches must be kept by the well-supplied machine shop; therefore, the frequent discarding of these tips may present both a financial and a procurement concern.

The device for connecting electric conductors set forth in U.S. Pat. No. 4,646,957 to Nuss is relevant to the present invention. In general, this patent sets forth "an ultrasonic welding apparatus for electrical conductors comprising strands of wire comprising a sonotrode for generating ultrasonic vibrations and a cooperating anvil having movable side walls to compress the wire strands against the head of the sonotrode. The anvil has two moving parts, one moving back and forth parallel to the fixed sonotrode face, and the other moving up and down normal to the fixed face. The moving parts carry the side walls of the anvil and with the fixed face provide an adjustable space for wires of various sizes, the space having a rectangular cross section. The gap between the moving anvil parts and the adjacent fixed face of the sonotrode are accurately controlled."

The present invention can be distinguished from Nuss for a number of reasons including that the horn tip of the subject invention moves while the anvil remains in a fixed position. By contrast, Nuss' sonotrode is fixed and the anvil moves. This is a significant distinction because a movable anvil can vibrate compliantly with the ultrasonic horn. In that case, the welding action is less effective. However, when the anvil is locked in position, as in the present invention, only the horn vibrates and a uniform, effective weld can be produced during each cycle of operation.

SUMMARY OF THE INVENTION

In accordance with the present invention, an ultrasonic welding apparatus is provided which utilizes a movable gathering device between the anvil, a stationary support, and the welding tip to allow for adjustably accommodating different sizes and numbers of wire workpieces to be welded. The welding tip is also redesigned to be long-wearing, simply-shaped in cross section, and easily manufactured. The tip presents several alternate and interchangeable worksurfaces at adjoining corners, which are made available, when needed, by rotating the tip.

The cross section of welding tip is preferably a square, but could also be any convex polygon, preferably a regular polygon. A convex polygon is one in which a straight line between any two points within the polygon does not cross the boundaries of the polygon. This cross sectional shape precludes any concave surfaces such as those defining the worksurface in FIG. 1 which allows for simple, inexpensive manufacturing. A regular polygon is one in which all sides are equal to each other, as are the angles formed thereby (e.g., a square). A welding tip of such a cross section can be rotated about its axis in order to present another worksurface without any adjustment of the axis position.

As indicated, four major parts are included in the apparatus of the present invention — an ultrasonic welding tip, an adjustable anvil against which the welding of the wires occur, and an adjustable gathering tool opposite to a support surface for confining the wire ends to be welded together between the anvil and welding tip. The anvil is adjustable to vary the serrated worksurface in contact with the bulk of the wires to be welded, which, in turn, is variable. All of these parts are of rectangular cross section. These parts are placed at ninety degree angles to each other, but are offset so the corners of adjacent parts do not contact each other. This arrangement forms a channel-shaped work area with a rectangular cross section, with each of the four parts contributing a single surface of the confined work area.

In order to assure efficient transmission of ultrasonic energy from the apparatus to the wire workpiece, the worksurfaces of the tip and the anvil are serrated. The relative position of the gathering tool to the support is adjustable thereby allowing for a work area of varying size according to the diameter or number of the wires to be welded. The adjustment of the serrated surface of the anvil to the tip can also be accomplished. Thus, a tight fit of the wire ends or workpiece in the work area to prevent splaying or extruding of the wires while in the plastic state during the welding process, is achieved, by adjustment of the gathering tool relative to the support, while wear reduction is achieved through rotation of the tip and adjustment of the work contact area of the anvil relative to the tip, preserving the holding serrations thereof for extended use.

The gathering tool and the tip can also freely swing away from their work position thereby allowing for easy insertion and removal of the wire workpiece. During the step of reducing the size of the work area, the gathering tool first moves towards the support for partially compressing the workpieces. Then the gathering tool and the welding move simultaneously towards the anvil to retain and compress the workpieces being welded. Once the welding is completed, the gathering block first moves away from the support. Then both the gathering block and the tip move away from the anvil. Once the work channel is open, the welded workpieces can be easily removed and unwelded workpieces inserted.

Prior art methods are used to vibrate the tip ultrasonically parallel to the longitudinal axis of the wire workpiece. During the ultrasonic welding process, the tip is exposed to substantial wear and tear, thus smoothing the serrations of the worksurface resulting in inefficient gripping of the wires and transmission of ultrasonic energy to the ends. Therefore, the worksurface of the tip must be frequently replaced.

The tip in the present invention has a total of four alternative worksurfaces, one at each corner of the square shape in cross section. Upon the exhaustion of one worksurface, the tip may be rotated to present another worksurface. Further, the simple cross-sectional shape of the tip allows for a reduced cost of manufacture and more multiple worksurfaces as compared to previous designs.

As is shown in FIG. 1, the prior art discloses a tip with only two worksurfaces but with a more intricate shape thus having a higher manufacturing cost, a higher manufacturing rejection rate, and a lower number of worksurfaces. Indeed, the lower manufacturing tolerances due to the simple square cross-sectional shape of the tip of the present invention could result in a lower manufacturing rejection rate per worksurface, thus allowing more worksurfaces to be placed on a tip without causing an unduly high manufacturing rejection rate of the multi-worksurfaced tip.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
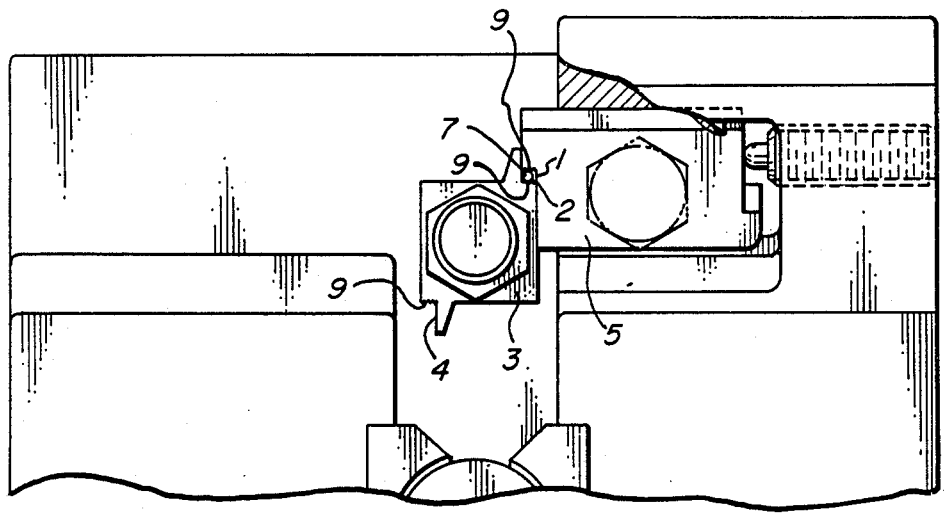
FIG. 1 is a front view in elevation, partly in cross-section, of a typical prior art ultrasonic welding device.
Figure 2:
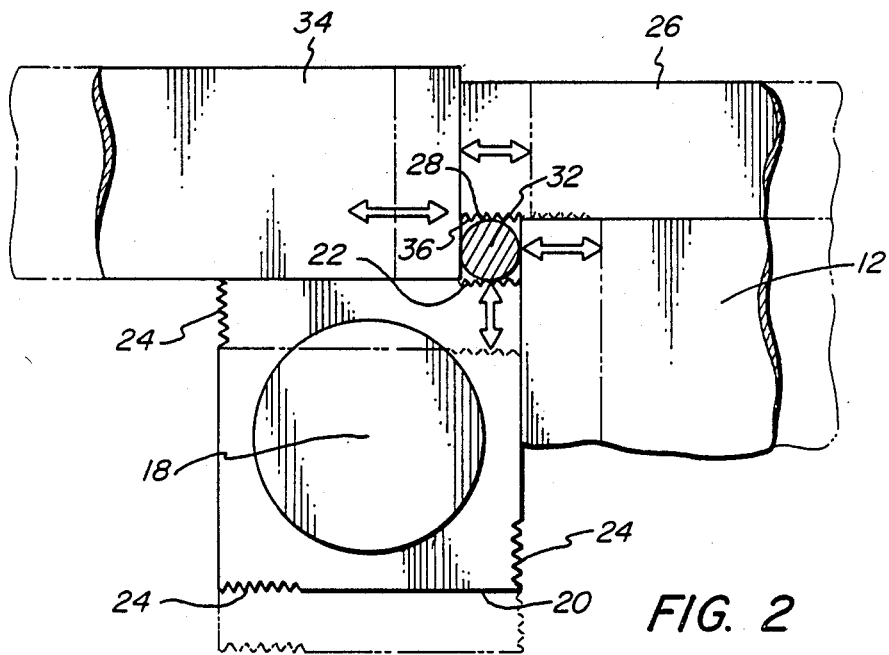
FIG. 2 is an enlarged front view in elevation, partly in cross-section, of the arrangement of the welding tip, anvil, support and gathering tool of the preferred embodiment of the present invention. Directions of travel of these four parts are illustrated.
Figure 3:
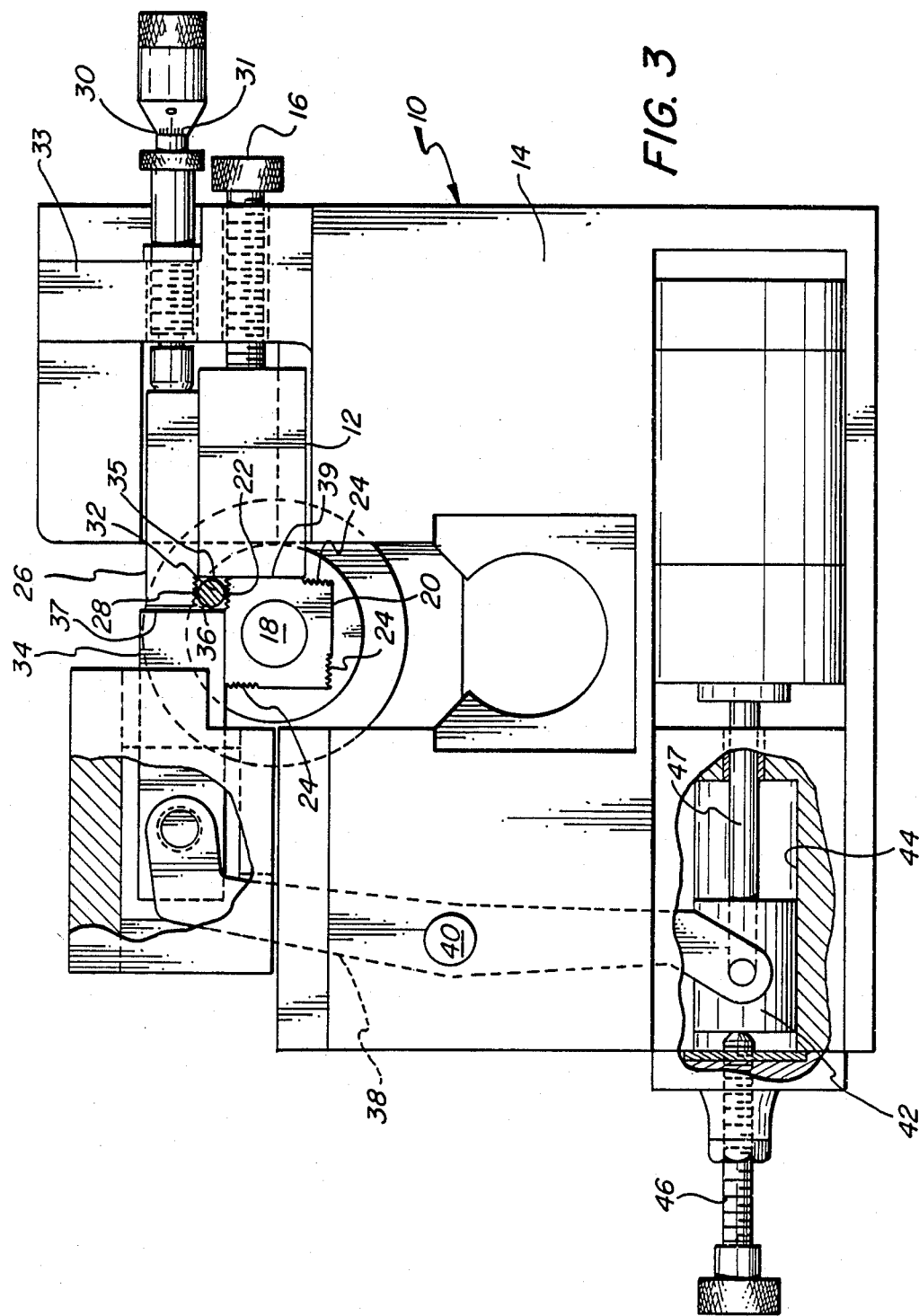
FIG. 3 is a front view in elevation, partly in cross-section, of the entire apparatus of the preferred embodiment, including the arrangement illustrated in FIG. 2.

Referring now to the drawings in detail wherein like numerals indicate like elements throughout the several views, the apparatus 10 of the present invention includes a support 12 seated on a main support structure or base 14. The position of support 12 on the base 14 is adjusted laterally by rotating the adjustment screw 16 rotatably fixed to an upright side of base 14 and connected to a threaded bore (not shown) in support 12. The support 12 is moved until it is flush with the side of a tip 20 connected to an ultrasonic welding horn. The tip 20 is square in cross section and has one serrated worksurface 22 and three auxiliary serrated worksurfaces 24 adjacent each corner. An anvil 26 having a serrated corner 28 is seated on support 12 and is adjusted via the rotation of an adjustment screw 30 provided with a vernier scale 31 to record the adjusted position of the anvil ralative to the base 14. The screw 30 extends through an upright portion 33 of base 14 into a threaded bore in the anvil 26 and is rotated until the serrated worksurface 28 of the anvil 26 overlies and is opposite from and parallel to the serrated worksurface 22 of the tip 20. The tip 20 can be positioned towards and away from serrated work surface 28 as indicated in FIG. 2.

A bundle of wire ends 32 to be welded are inserted into the partly enclosed notch or work area 35 defined by the serrated edges 28 and 22 and the adjacent edge surface 39 of support 12 and is fully enclosed by the edge surface 37 of a gathering tool 34 transforming the partly enclosed notch into a closed working area 36. The gathering tool 34 is pivotably attached to one end of a crank arm 38 which is rotatably mounted on a pivot pin 40 in base 14 intermediate its ends. The opposite end of the crank arm 38 is pivotably attached to piston head 42 slidable within a cylindrical channel 44 in base 14. The working position of the gathering tool 34 is adjusted by the rotation of the screw 46 threadedly received through a sidewall of base 14 which bears against piston head 42. Upon clockwise rotation of screw 46, piston head 42 is moved laterally into cylindrical channel 44, against, e.g., hydraulilc dampening of its shaft 47 causing crank arm 38 to pivot in a counterclockwise direction about pin 40, moving gathering tool 34 away from the edge of anvil 26 on top of tip 20. Forced hydraulic return of piston shaft 47 and piston head 42, upon counterclockwise rotation of screw 46, causes gathering tool 34 to move towards the edge of anvil 26.

The adjustment of the relative positions of the tip 20, support 12, anvil 26 and gathering tool 34 is important so as to change the size of working area 36 thereby providing a tight fit and confinement around one or more of the wire ends 32 in the work area 36 so as to prevent splaying and plastic extrusion during the welding process. Further, this variable size of the working area 36 is accomplished without replacing machine parts, thereby reducing financial and procurement concerns.

After the wire end 32 is inserted and tightly enclosed in the work area 36 by the gathering tool 34, welding of the wire ends 32 is effected by the ultrasonic horn 18 vibrating the tip 20 in a direction parallel to the longitudinal axis of the wire ends 32 at a frequency of 20-40 KHZ.

During repeated use of the ultrasonic welding process, the serrated worksurface 22 of the tip 20 is exposed to substantial wear. Eventually, the serrated worksurface 22 of the tip 20 will become smooth, resulting in inefficient transmission of ultrasonic energy, due to the loss of grip on the article being welded, thereby rendering ineffective, ultrasonic vibration transmitted to the article. Upon exhaustion of a serrated worksurface 22 of the tip 20, the tip 20 may be rotated around the horn 18 is ninety degree increments so as to place any of the three auxiliary serrated worksurfaces 24 of the tip 20 into working position opposite to serrated edge 28 of anvil 26. These auxiliary serrated worksurfaces 24 of the tip 20 are identical to the serrated worksurface 22 of the tip 20 and thereby prolong the useful life of the tip 20 as a whole.

The length of the serrated edge 28 of anvil 26 introduced in the work area 36 may be varied by rotation of screw 30 to preserve the useful life thereof, if the entire gripping surface is not needed.

Figure 4:
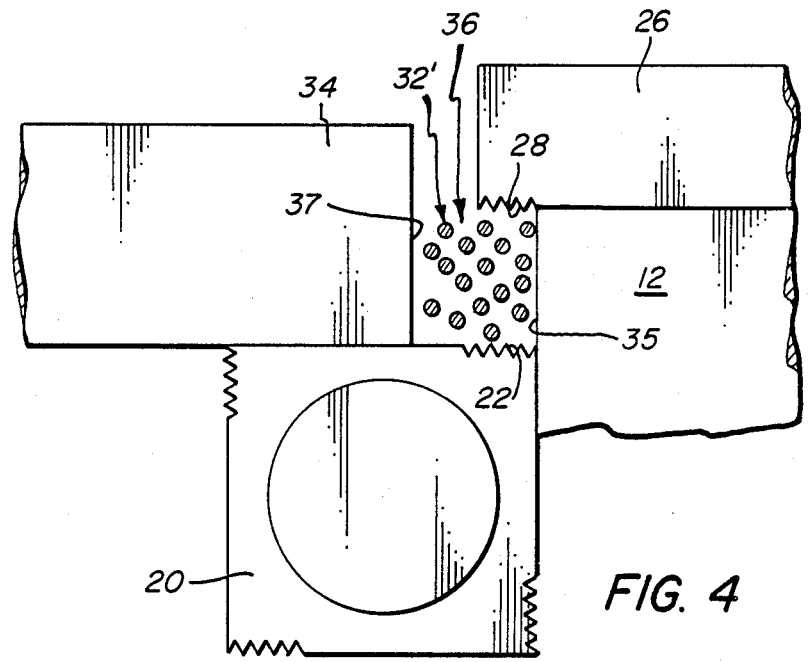
FIG. 4 is an enlarged front view in elevation, partly in cross-section, of the arrangement of the work channel in the fully opened configuration.

An important aspect of the present invention relates to the sequence of adjustment of the relative positions of the tip 20, support 12, anvil 26 and gathering tool 34. Referring to FIG. 4, the working area, also known as the adjustably sized channel 36 is in its fully open position. At this stage, a bundle of wire ends 32' are inserted into the working area 35 defined by the first and third work surfaces 22 and 28, respectively, each having a serrated edge thereon and adjacent second and fourth work surfaces 37 and 39, respectively, of the gathering block 34 and the support 12.

Figure 5:
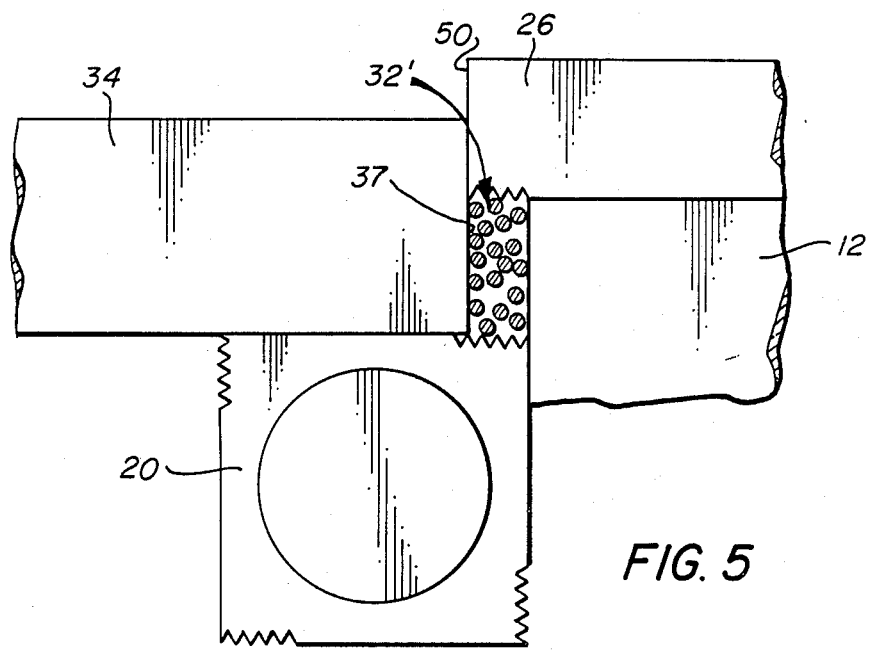
FIG. 5 is an enlarged front view in elevation, partly in cross-section of the arrangement of the work channel in a partially enclosed configuration.

Next, as illustrated in FIG. 5, the gathering block 34 moves towards the anvil 26 so that the work surface 37 contacts the surface 50 of anvil 26. Although the surface 37 can be in contact the surface 50, it is preferable that no frictional load is created when the gathering block 34 moves parallel to the face 50. Therefore, a small space of about 0.001 to about 0.002 inches is typically provided. The amount of space between the parts is controlled by the fineness of the wire ends 32'. For example, if the wire ends are very fine, it is more important to provide a small spacing so that the wire ends do not get caught between the parts of the machine.

Figure 6:
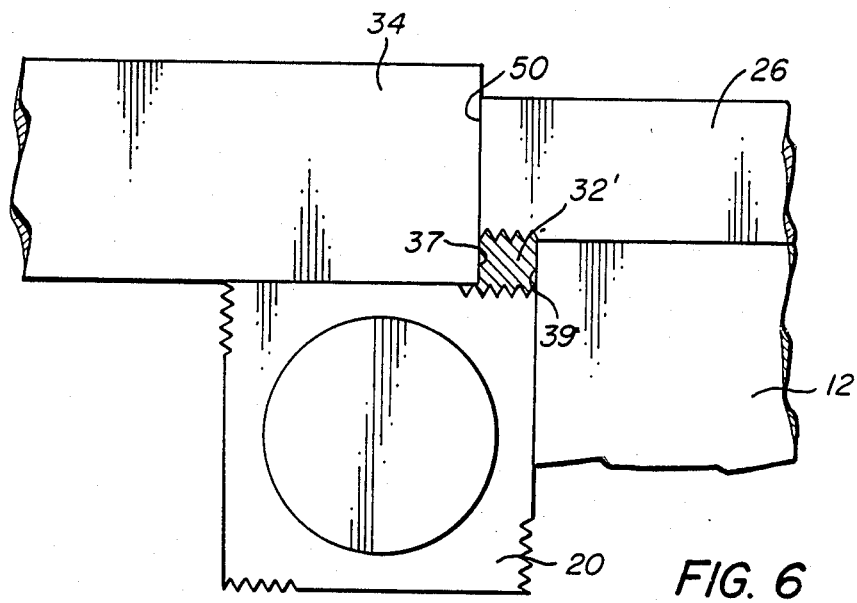
FIG. 6 is an enlarged front view in elevation, partly in cross-section of the arrangement of the work channel in a fully enclosed configuration.

In the next stage of operation, as shown in FIG. 6, the tip 20 moves upward together with the gathering block 34 whereby the size of the adjustably sized channel is reduced to compress the wire ends 32'. Then, ultrasonics are applied and the wire ends are welded together.

Figure 7:
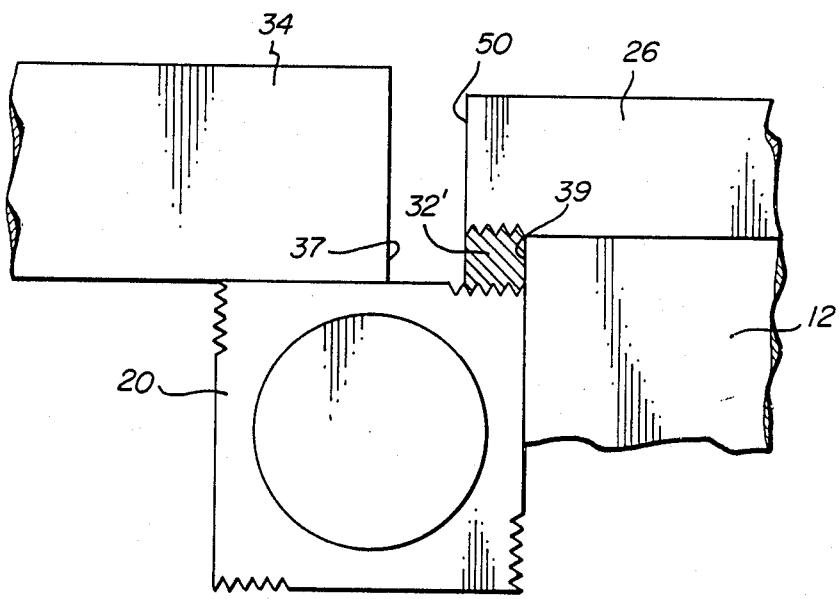
FIG. 7 is an enlarged front view in elevation, partly in cross-section of the arrangement of the work channel in a partly enclosed configuration, subsequent to welding the wires.

Subsequent to the welding of the wire ends 32', the gathering block 34 is moved away from the surface 50 of the anvil 26 as shown in FIG. 7. Then, both the gathering block 34 and the tip 20 move back to their original positions as shown in FIG. 4. It is advantageous that the gathering block moves away from the anvil 26 to prevent friction with the face 50. Also, by increasing the size of the channel 36, there is less friction generated between the welded wires 32' and the surface 39 of the support 12. The gathering block moves more quickly than the tip 20 and therefore can be considered to move prior to the movement of the tip 20. However, it is within the terms of the present invention that the tip 20 begin to move away from the anvil 26 at the same time that the gathering block 34 moves away from the anvil 26. However, the speed of the movement of the gathering block results in it opening the channel 36 before the tip has a chance to move a significant distance from the anvil.

Figure 8:
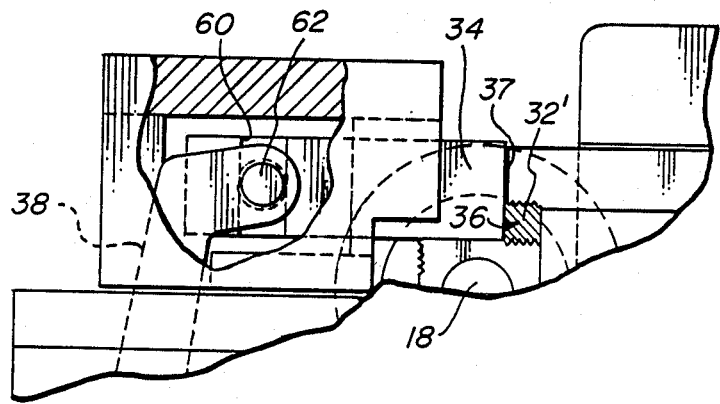
FIG. 8 is a sectional view illustrating a slot which enables independent movement of the gathering block with respect to the horn tip.

To more fully understand the operation of the present invention, FIG. 8 illustrates a section of the connection between the crankarm 38 and the gathering block 34. A slot 60 is provided in the gathering block component which enables the gathering block to move with respect to the pin 62 connecting the crankarm 38 to the gathering block.

The patents and patent applications set forth in the specification are intended to be incorporated in their entireties by reference herein.

It is apparent that there has been provided in accordance with this invention a device for ultrasonically welding workpieces and the method of using the device which satisfies the objects, means and advantages set forth hereinbefore. While the invention has been described in combination with the embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A device for ultrasonically welding workpieces, comprising:

an ultrasonic horn which produces ultrasonic vibrations, said ultrasonic horn having a welding tip with a first work surface disposed parallel to the axis of the ultrasonic vibrations;

an adjustably sized channel for retaining and compressing said workpieces during the welding process, said adjustably sized channel comprising:

a gathering tool slidably mounted for back and forth movement parallel to said first work surface and having a second work surface facing into the interior of said adjustably sized channel and disposed at right angles to said first work surface;

an anvil adjustably mounted with respect to the first work surface, said anvil having a third work surface facing into the interior of said adjustably sized channel and disposed opposite and facing the first work surface of said head;

a support having a fourth work surface facing into the interior of said adjustably sized channel and disposed normal to said first work surface and extending at least between said first and third work surfaces whereby said adjustably sized channel is defined by the first, second, third and fourth work surfaces;

means for decreasing the size of said adjustably sized channel comprising: means for moving said second work surface towards said fourth work surface whereby the workpieces are compressed between said gathering tool and said support; and means for moving said gathering tool and said horn tip towards said anvil whereby the workpieces are compressed between the welding tip and the anvil.

2. The device of claim 1 including:

means for increasing the decreased size of said adjustably sized channel, the increasing means comprising:

means for sliding said second work surface away from said fourth work surface whereby the workpieces are released from between said gathering tool and said support; and means for moving said gathering tool and said horn away from said anvil whereby the workpieces can be removed from said adjustably sized channel.

3. The device of claim 2 wherein the work surface of said welding tip is fixed.

4. The device of claim 3 wherein the first work surface of said anvil is fixed during the operation of the apparatus.

5. The device of claim 4 wherein said anvil is slidably mounted adjacent said support for back and forth movement parallel to the work surface of said welding head whereby the working position of the anvil is defined.

6. The device of claim 5 wherein the working position of said gathering tool, defined by the position of the second work surface relative to said first work surface of said welding tip, is adjustable laterally with respect to said welding head.

7. The device of claim 6 wherein the distance between the first work surface of said head and the third work surface of said anvil is adjustable.

8. The device of claim 7 wherein said welding tip has a cross-sectional shape of a convex polygon substantially free of concave surfaces, said tip having several alternative work surfaces about the periphery of said convex polygon successively available by rotation.

9. The device of claim 8 wherein the second work surface of said gathering tool is movable towards and away from said adjustably sized channel.

10. The apparatus of claim 4 wherein the distance between said work surface of said anvil and the work surface of said tip is adjustable.

11. The apparatus of claim 10 wherein said welding tip is moveable towards and away from said adjustably sized channel.

12. The method of ultrasonically welding workpieces, comprising the steps of:

providing an ultrasonic welding device having an ultrasonic horn and a welding tip;

providing an adjustably sized, rectangularly shaped, walled channel comprising four work surfaces for retaining and compressing the workpieces;

disposing said workpieces within said channel;

adjusting the size of said channel, said adjusting step comprising the steps of:

moving a second work surface disposed at right angles to a first work surface with respect to a fourth work surface; and subsequently moving the first and second work surfaces with respect to a third work surface.

13. The method of claim 12 including the steps of:

disposing said workpieces within said channel;

moving said second work surface towards said fourth work surface to partially enclose said channel;

moving said first and second work surfaces towards said third work surface to fully enclose said channel whereby said workpieces are compressed in the channel; and ultrasonically welding said workpieces.

14. The method of claim 13 including the steps of:

moving said second work surface away from said fourth work surface;

moving said first and second work surfaces away from said third work surface whereby the welded workpieces can readily be removed from said channel.

15. The method of claim 14 wherein said step of providing an adjustably sized channel includes the steps of:

providing said welding tip with the first work surface;

providing said anvil with the third work surface;

laterally adjusting the third work surface of said anvil with respect to the first work surface of said tip;

providing a gathering tool with the second work surface disposed between said first work surface of said tip and the third work surface of said anvil; and providing a support with the fourth work surface facing the second work surface of the gathering tool.

16. The method of claim 15 including the step of fixing the position of the anvil prior to the step of ultrasonically welding.

17. The method of claim 16 including the steps of:

providing the welding tip with a cross-sectional shape of a convex polygon having several alternative work surfaces about the periphery of said convex polygon successively available by rotation; and rotating said welding tip to dispose one of said work surfaces in a position to form said first wall of said adjustably sized chamber.

18. The method of claim 17 including the step of providing said welding tip with a square cross-sectional shape.

19. The method of claim 18 including the step of providing serrations in the first work surface of said tip and the second work surface of said anvil to tightly confine the workpieces.

20. The method of claim 19 including the step of selecting said workpieces from wire ends.

21. A device for ultrasonically welding workpieces, comprising:
an ultrasonic horn which produces ultrasonic vibrations, said ultrasonic horn having a welding head with a work surface disposed parallel to the axis of the ultrasonic vibrations, the work surface of said welding head being fixed;
an adjustably sized channel for retaining and compressing said workpieces during the welding process, said adjustably sized channel comprising:
a gathering tool slidably mounted for back and forth movement parallel to said work surface and having an edge surface disposed at right angles to said work surface;
an anvil adjustably mounted with respect to the work surface of said head, said anvil having a work surface facing into the interior of said adjustably sized channel and opposite the work surface of said head; and
a support having an edge surface extending normal to said work surface and disposed below said anvil whereby said channel is defined by the edge surface of the gathering tool, the work surface of the anvil and the edge surface of the support in conjunction with the work surface of the head.

22. The apparatus of claim 21 wherein the work surface of said anvil is fixed during the operation of the apparatus.

23. The apparatus of claim 22 wherein said anvil is slidably mounted adjacent said support for back and forth movement parallel to the work surface of said welding head whereby the working position of the anvil is defined.

24. A device for ultrasonically welding workpieces, comprising:
an ultrasonic horn which produces ultrasonic vibrations, said ultrasonic horn having a welding head with a work surface disposed parallel to the axis of the ultrasonic vibrations, said welding head having a cross-sectional shape of a convex polygon substantially free of concave surfaces, said tip having several alternative work surfaces about the periphery of said convex polygon successively available by rotation;
an adjustably sized channel for retaining and compressing said workpieces during the welding process, said adjustably sized channel comprising:
a gathering tool slidably mounted for back and forth movement parallel to said work surface and having an edge surface disposed at right angles to said work surface;
an anvil adjustably mounted with respect to the work surface of said head, said anvil having a work surface facing into the interior of said adjustably sized channel and opposite the work surface of said head; and
a support having an edge surface extending normal to said work surface and disposed below said anvil whereby said channel is defined by the edge surface of the gathering tool, the work surface of the anvil and the edge surface of the support in conjunction with the work surface of the head.

25. The apparatus of claim 24 wherein the edge surface of said gathering tool forms a wall of said adjustably sized channel, said gatheing tool being moveable towards and away from said adjustably sized channel.

26. The apparatus of claim 25 wherein the working position of said gathering tool, defined by its position relative to said work surface of said welding head, is adjustable laterally with respect to said welding head.

27. The apparatus of claim 26 wherein the distance between the work surface of said head and the work surface of said anvil is adjustable.

28. The apparatus of claim 27 wherein said workpiece comprises wire ends.

29. The method of ultrasonically welding workpieces, comprising the steps of:
providing an ultrasonic welding device having an ultrasonic horn and a welding tip;
providing an adjustably sized channel for retaining and compressing the workpieces including the steps of:
providing said tip with a work surface;
providing said anvil with a work surface;
laterally adjusting the work surface of said anvil with respect to the work surface of said tip;
providing a gathering tool with an edge surface disposed between said work surface of said tip and the work surface of said anvil;
providing a support with an edge surface facing the work surface of the gathering tool;
adjusting the size of said channel to retain and compress the workpieces;
partially enclosing said channel, said step of partially enclosing said channel including the step of moving the edge surface of said gathering tool away from said adjustable channel;
disposing said workpiece within said partially enclosed channel;
fully enclosing said channel whereby the workpieces are compressed in the channel, said step of fully enclosing said channel including the step of moving the edge surface of said gathering tool towards said adjustable channel; and
ultrasonically welding said workpieces.

30. The method of claim 29 including the steps of:
providing the welding tip with a cross-sectional shape of a convex polygon having several alternative work surfaces about the periphery of said convex polygon successively available by rotation; and
rotating said ultrasonic horn to dispose one of said work surfaces in a position to form said at least one wall of said adjustably sized chamber.

31. The method of claim 30 including the step of moving said work surface of said welding tip towards the work surface of said anvil whereby said adjustably sized channel is partially enclosed.

32. The method of claim 31 including the step of fixing the position of the anvil prior to the step of ultrasonically welding.

33. The method of claim 32 including the step of providing said tip with a square cross-sectional shape.

34. The method of claim 32 including the step of providing serrations in the work surface of said tip and the work surface of said anvil to tightly confine the workpieces.

35. The method of claim 34 including the step of selecting said workpieces from wire ends.

* * * * *